Oct. 1, 1929.  P. A. FRIEDELL  1,730,270
SPEED REDUCING TRANSMISSION
Filed Feb. 11, 1929
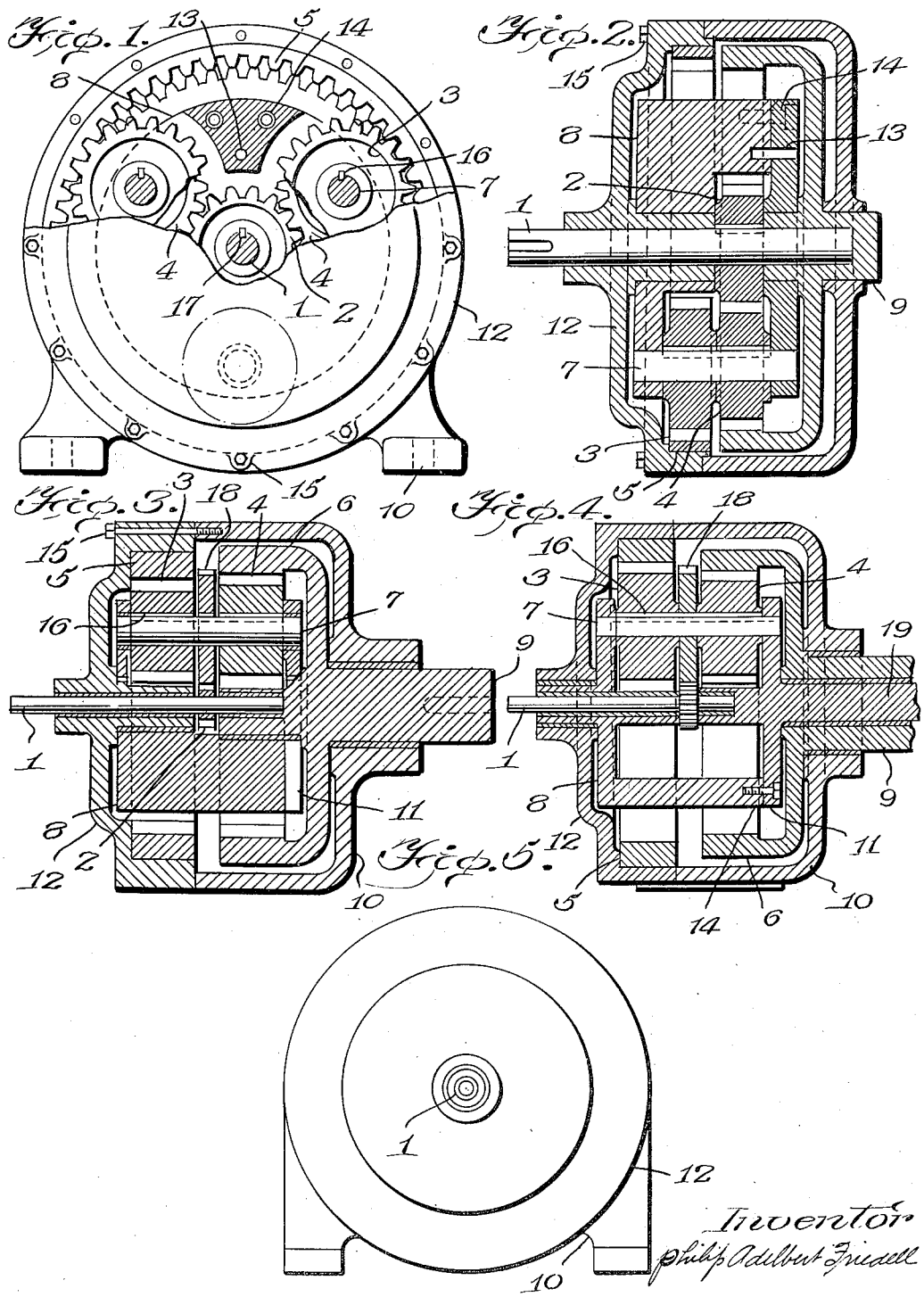

Patented Oct. 1, 1929

1,730,270

UNITED STATES PATENT OFFICE

PHILIP ADELBERT FRIEDELL, OF OAKLAND, CALIFORNIA

SPEED-REDUCING TRANSMISSION

Application filed February 11, 1929. Serial No. 339,194.

In the existing methods of speed reduction it is possible to obtain only one ratio, with one driven shaft, on the same center. Also the ratio, for the number and diameter of wheels or gears, is very low, in comparison to my method. In my method there is no relationship between ratio, and diameter of pinion and gear. In addition to the normal ratio obtained between the drive pinion and driven gear, another ratio is obtained between a pair of planetary gears, due to the difference in pitch diameter of the planetary gears, which are fixed together on the same shaft. The less the difference in diameter of the planetary gears or wheels, the higher will be the ratio, so that with planetary gears or wheels of the same diameter, there will be no movement of the driven gear or wheel, and the ratio will be infinite.

My invention relates to speed reducing transmissions in which two or more sets of planetary wheels or gears fixed together, are mounted on idler shafts, and in a spider or drum, and revolve in an orbit about a common center, one of each set of planetary gears or wheels being in tangential contact with a fixed gear or wheel, another of each set of planetary gears or wheels being in tangential contact with a gear or wheel fixed to a drum or spider which is free to turn on the same center as the planetary spider, a drive wheel in tangential contact with a third planetary wheel in each set, all being less than one half the diameter of either the fixed or driven wheel, a shaft integral with or fixed to the driven wheel drum, and a shaft integral with or fixed to the planetary spider or drum, and carried into, or through the driven wheel drum hub or shaft, and means whereby the two driven shafts may be run in the same, or in opposite directions.

In the accompanying drawings, Fig. 1, a front elevation, and Fig. 2, a cross-sectional elevation, the planetary spider and gears are shown as driven by a pinion in contact with one of the differential planetary gears, and with only one driven shaft. In Fig. 3, a cross-sectional elevation, a separate wheel fixed to the differential planetary wheels, and in contact with the drive pinion or wheel, for driving the planetary wheels and spider is shown, with but one driven shaft. Fig. 4 is similar to Fig. 3, except two driven shafts are shown, one fixed to the driven wheel drum, and the other fixed to the planetary spider or drum. As shown, all three shafts would turn in the same direction. By transposing the two ring gears and differential planet gears, the drive shaft and the planetary spider shaft would turn in one direction, and the driven drum shaft would turn in the opposite direction.

The object of my improvement is, first, to provide very high ratios with the least possible number and diameter of gears or wheels, thereby requiring very little space, consequent reduction of friction losses, and, low cost. Second, to provide, when desired, a speed reducing transmission with two driven shafts on the same center for a single stage reduction, and two or more driven shafts for more than one stage reduction, with different ratios, running in the same or in opposite directions; third, to provide a speed reducing transmission which will, in one or two stages, provide all ratios commonly used in commercial practice. In an existing type of speed reducer, two stages providing a ratio of about 36 to 1, would provide in my method, with the same size ring gears, a ratio of approximately 400,000 to 1. My system is not commercially practical for ratios much below 30 to 1.

The method shown in Figs. 1 and 2 is best suited where small pitch gears are used, or where only a small amount of power is to be transmitted by the driven shaft, while the method shown in Figs. 3 and 4 is best suited for commercial production, as different ratios may be obtained by the installation of drive pinion and driven planetary gears of different ratios, maintaining the same centers. No other changes are necessary in this type of speed reducer to change the ratio.

In the accompanying drawings, Fig. 1 is a front elevation of the direct method of obtaining the reduction, where the drive pinion is in tangential contact with one of the differential planetary gears, and is shown with part of the case and part of the planetary spider broken away. Fig. 2 is a cross-sectional elevation taken through the center of this type of speed reducer. Fig. 3 is a cross-sectional elevation through the speed reducer, showing the drive pinion in tangential contact with a driven planetary gear, which planetary gear is fixed to the main or differential planetary gears, and turns with them, and is fitted with but one driven shaft. Fig. 5 is a front elevation of the speed reducer. Fig. 4 is a sectional elevation of the speed reducer as illustrated in Fig. 3, except being provided with two driven shafts, one shaft being driven by the planetary drum or spider, and the other shaft being driven by the driven ring gear. The drawings illustrate the most desirable methods of obtaining reductions.

Similar numerals refer to similar parts throughout the several views. The frame 10, and the cover 12, together with the studs 15, constitute the housing of the speed reducing unit. The shaft 1 is driven by an external source of power, and turns in the housing cover 12, Fig. 2 and 3, or spider hub 8, Fig. 4, and in the driven hub or shaft 9, Fig. 2 and 3, or spider hub 11, Fig. 4. Integral with the shaft 1 is the drive pinion 2 which meshes with the planetary gear 4, Fig. 2, or 18, Fig. 3 and 4. The planetary gears 3 and 4, or 3, 4 and 18 are mounted and fixed together on the same shaft 7, said shaft being free to turn in bearings in the planetary spider or drum 8, and cover 11. The spider or drum 8 is free to turn on, or in the hub on the housing cover 12, and the planetary spider cover 11 is free to turn with the planetary spider 8, on or in the drum hub 9. The planetary spider 8 and planetary spider cover 11 are aligned by means of dowels, or keyed, and held together by the screws 14. The spider 8 is bored to receive the various gears and pinions as indicated by the cross-section in Fig. 1 for the purpose of obtaining dynamic and static balance. It is preferred to use two or more sets of planetary wheels for this purpose, three sets being ideal, on account of three point contact, which tends to equalize the unit. The planetary gears 3 mesh with the internal gear 5, which is pressed into the housing cover 12, and keyed or doweled to prevent movement. The planetary gears 4 mesh with the internal gear 6, which is made integral with or fixed to the driven drum or spider and hub 9.

The action of the speed reducing unit as illustrated in Figs. 1 and 2 is as follows: The drive shaft 1, driven from an external source, turns the drive pinion 2, which turns the planetary gears 3 and 4, which are fixed together. The planetary gear 3, meshing with the fixed internal gear 5, causes the planetary gears 3 and 4, with the planetary spider 8 and cover 11 to revolve in an orbit about the drive shaft 1, as also on their own axis. As the two planetary gears 3 and 4 are of different diameters, and the internal gears 5 and 6 are of correspondingly different diameters, the internal gear 6 is caused to advance a distance equal to the difference in the circumferential distance traveled by the two planetary gears 3 and 4 in one revolution about the fixed internal gear 5, minus the difference in the circumferential distance in one revolution of the internal gears 5 and 6. Therefore in addition to the ratio obtained by the drive pinion 1, planetary gear 3, and fixed internal gear 5, a further reduction is obtained through the differential between the two planetary gears 3 and 4 and the two internal gears 5 and 6, providing very high ratios.

The action of the speed reducer in Fig. 3 is as follows: The drive pinion 2 meshes with and turns the planetary pinion 18, which is fixed to the two planetary gears 3 and 4. Planetary gear 3 meshes with the fixed internal gear 5, thereby causing the planetary gears 3 and 4 and 18 shaft 7, spider 8 and spider cover 11 to revolve in an orbit about the drive shaft 1. Further action of the speed reducer is similar to that explained for Figs. 1 and 2. As illustrated in Fig. 3, with gears having the following numbers of teeth; drive pinion 2, 20 teeth; planetary gear 18, 64 teeth; planetary gear 3, 13 teeth; planetary gear 4, 14 teeth; ring gear 5, 34 teeth; ring gear 6, 35 teeth; the ratio obtained would be 283:1, whereas the same gears used under existing conditions would give a ratio of approximately 23:1. The system illustrated in Figs. 3 and 4 also provides a more compact unit than any other system.

I am aware that prior to my invention, speed reducing transmissions have been made with drive pinion, planetary gears, and internal gears. Therefore I do not claim such a combination broadly, but I claim:

1. In combination, a drive shaft, a drive pinion fixed to or integral with said drive shaft, two or more primary planetary gears meshing with said drive pinion, two or more secondary planetary gears of different diameter than said primary planetary gears integral with or fixed to said primary planetary gears, said planetary gears, being mounted on idler shafts, said idler shafts being mounted in a drum or spider, said spider or drum being free to revolve about the center of rotation of said drive pinion and a drive shaft, means for dynamically and statically balancing said drum or spider, a stationary ring gear integral with or fixed to a support or housing, said ring gear being in tangential contact with either said primary planetary gears or with said secondary planetary gears, a driven ring gear in tangential contact with the others of said planetary gears, said driven ring gear being integral with or fixed to a drum or spider, a hub on said drum or spider, a driven shaft integral with or fixed to said hub, a driven shaft integral with said planetary drum or spider and extending through said driven shaft, said driven shafts revolving on the same center as said drive shaft, and a support or housing for the entire mechanism, substantially as described.

2. In combination, a housing or case, a drive shaft, a drive pinion or wheel integral with or fixed to said drive shaft, two or more driven planetary gears or wheels in tangential contact with said drive pinion or wheel, differential planetary gears or wheels of different diameters integral with or fixed to each of said driven planetary gears or wheels, said driven and differential planetary gears or wheels being mounted on and free to rotate on or with said idler shafts, said idler shafts being mounted in a spider or drum, said spider being free to revolve on or in bearings about said drive shaft, means for obtaining dynamic and static balance of said spider or drum, planetary gears or wheels and idler shafts, a stationary ring gear or wheel integral with or fixed to said housing or case and in tangential contact with one of each set of planetary gears or wheels of one diameter, a driven ring gear in tangential contact with the planetary gears or wheels of a different diameter, said driven ring gear being integral with or fixed to a drum or spider, a hub on said drum or spider, a support and bearings for said hub, a driven shaft integral with or fixed to said hub, substantially as described.

3. In combination, a support, or a housing, a drive shaft, a drive pinion or wheel fixed to said drive shaft, two or more driven planetary gears or wheels in driving contact with said drive pinion or wheel and spaced equidistant about an orbit about said drive shaft, said driven planetary gears or wheels being mounted on idler shafts, said idler shafts being mounted in a spider or drum, said spider or drum being free to revolve about the axis of said drive shaft, a pair of differential planetary gears or wheels fixed to each of said driven planetary gears or wheels, each pair of differential planetary gears or wheels consisting of two gears or wheels of different diameters, a ring gear or wheel fixed to said support or housing, said ring gear being integral with or fixed to said support or housing and in driving contact with the differential planetary gears or wheels of one diameter, a second or driven ring gear or wheel integral with or fixed to a drum or spider and in driving contact with the differential planetary gears or wheels of another diameter, said spiders or drums being free to revolve, driven shafts integral with or fixed to said spiders or drums, said planetary drum shaft passing through the center of said driven ring wheel shaft, substantially as described.

4. In combination, a fixed ring gear or wheel, a driven ring gear or wheel integral with or mounted on a drum or spider, said drum or spider having a hub or shaft integral with or fixed to it, two or more sets of planetary gears or wheels, each set consisting of three planetary gears or wheels fixed together and mounted on the same shaft, at least two of said planetary gears or wheels in each set being of different diameters, an idler shaft for each set of planetary gears or wheels, a housing or drum for supporting said planetary gears or wheels and shafts equidistant from and about the common center, said housing or drum being free to revolve about the common center, a drive pinion or wheel in tangential contact with one of each set of planetary gears or wheels, another of each set of planetary gears or wheels being in tangential contact with said fixed ring gear or wheel, and the third of said planetary gears or wheels of each set being in tangential contact with said driven ring gear or wheel, a drive shaft for said drive pinion or wheel, and a housing or support for the entire mechanism, substantially as described.

5. In combination, a support or housing, a fixed internal ring wheel, a movable internal ring wheel, one or more sets of planetary wheels, each set consisting of two differential planetary wheels and a driven planetary wheel fixed together and mounted on a shaft or pivot, and free to rotate on or with said shaft or pivot, said shafts or pivots being mounted in a drum or housing equidistant from, and about the center of said drum or housing, said drum or housing being free to rotate on its common center, said differential planetary wheels meshing with said fixed and movable internal ring wheels, a drive wheel meshing with said driven planetary wheels, a drive shaft integral with said drive wheel, and means for mounting and transmitting the movement of said movable ring wheel, substantially as described.

PHILIP ADELBERT FRIEDELL.